(No Model.)
F. C. BUTZE & C. C. HEWITT.
CAR OR LOCOMOTIVE WHEEL.
No. 597,174. Patented Jan. 11, 1898.
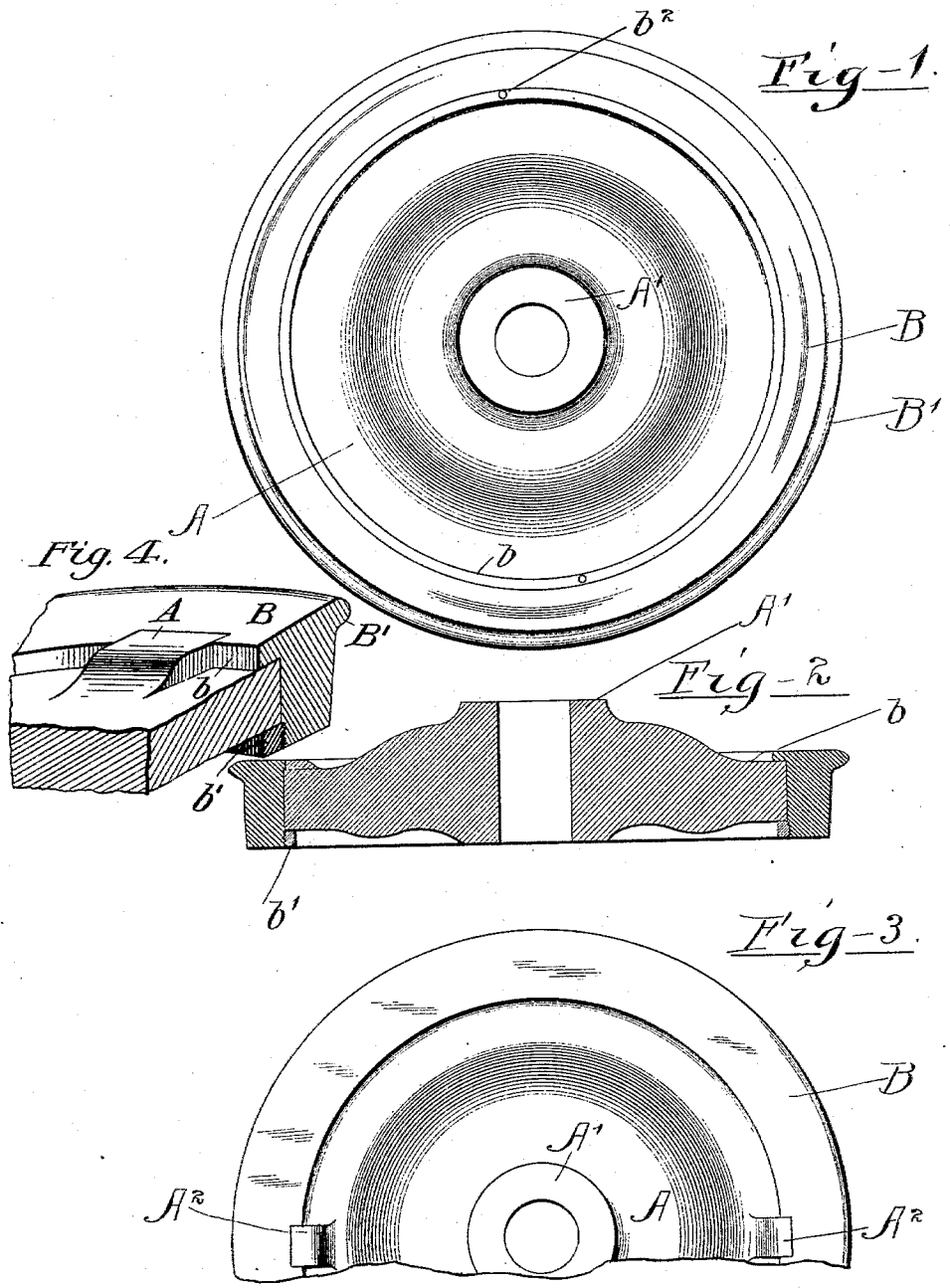
Witnesses
Harold H Barrett
William H Hall
Inventors
Frank C. Butze
Carlton C. Hewitt
by Poole & Brown
their Attys.

UNITED STATES PATENT OFFICE.

FRANK C. BUTZE AND CARLTON C. HEWITT, OF CHICAGO, ILLINOIS.

CAR OR LOCOMOTIVE WHEEL.

SPECIFICATION forming part of Letters Patent No. 597,174, dated January 11, 1898.

Application filed May 21, 1897. Serial No. 637,484. (No model.)

*To all whom it may concern:*

Be it known that we, FRANK C. BUTZE and CARLTON C. HEWITT, of Chicago, in the county of Cook and State of Illinois, have invented certain new and useful Improvements in Car or Locomotive Wheels; and we do hereby declare that the following is a full, clear, and exact description thereof, reference being had to the accompanying drawings, and to the letters of reference marked thereon, which form a part of this specification.

This invention relates to improvements in railway-car or locomotive wheels of that class provided with detachable tires; and the invention relates more specifically to an improved means for locking said tires to the web or body portion of the wheel, by means of which movement thereof with relation to said web or body, both laterally and circumferentially, may be prevented.

The invention consists in the matters hereinafter set forth, and more particularly pointed out in the appended claims.

In the drawings illustrating one embodiment of our invention, Figure 1 is a front elevation of a wheel constructed in accordance with our invention. Fig. 2 is a cross-section taken on line 2 2 of Fig. 3, and Fig. 3 is a fragmentary rear elevation of the wheel shown in Fig. 1. Fig. 4 is a detail view showing one of the interfitting lugs between the body and tire of the wheel.

As shown in said drawings, A designates the web or body portion of the wheel, and B the tire or tread thereof. The body portion is provided with the usual hub A', which is apertured in the usual manner for the reception of the axle. The axle will be secured in said aperture in a familiar manner. The tire B is provided with the usual annular flange B', which engages the inner face of the track-rail and by means of which the wheel is prevented from moving laterally on said rail. The body portion of the wheel will be made of any suitable material and the tire of hardened steel, and said tire will be fitted upon said body portion by expanding the same and shrinking it in place in the usual manner.

The tire is provided, as herein shown, on the inner side thereof with an inwardly-extending annular flange $b$, which forms an annular shoulder, against which the inner face of the body of the wheel, adjacent to the periphery thereof, rests when the tire is in position thereon. The body portion of the wheel, adjacent to the periphery thereof, is of less width than the lateral width of the tire. The tire is provided with a ring which has detachable locking engagement with the inner circumference of the tire laterally outside of said body portion and which engages the body portion to clamp it between said ring and the flange $b$. The connection between said ring and tire may be of any convenient or preferred form by which it may be quickly and easily mounted in its operative position. As herein shown, the inner circumference of the tire laterally opposite said flange $b$ and adjacent to the outer side of the body A is provided with a screw-threaded portion which is adapted to be engaged by an externally-screw-threaded retaining-ring $b'$. Said ring is made of a depth equal to the difference between the width of the body portion of the wheel and the distance between the flange $b$ and the front face of the tire, so that when secured in place upon the tire the outer surface thereof rests flush with the said outer surface of the tire. With this construction it will be seen that the body of the wheel is locked firmly between the flange $b$ and the retaining-ring $b'$ and positively prevented from lateral movement in either direction.

As before stated, the tire will be fitted upon the wheel in the usual manner by expanding the same and allowing it to shrink thereon. It will not ordinarily be desirable to remove the retaining-ring $b'$ after it has been applied to the tire. In order that said ring may be securely locked in place, it will be made of a diameter slightly greater than the diameter of the tire when at a normal temperature and of its minimum diameter, but of slightly-less diameter than said tire when it has been expanded to its maximum diameter to be fitted upon the body of the wheel. When the tire is thus expanded and the body of the wheel fitted therein, the retaining-ring will be screwed down upon the body of the wheel while the tire is in its expanded condition, so that when the tire becomes cooled it will shrink upon the retaining-ring with slightly-greater tension than upon the body of the wheel. The retaining-ring $b'$ is provided with apertures $b^2$, with which a spanner or other suitable tool may be engaged to secure the ring in place. If found desirable, the location of the ring $b'$ and the flange $b$, between which the body of the wheel is clamped, might be reversed. Moreover, the connection between the tire B and retaining-ring $b'$ might be provided by means of a bayonet or other joint instead of a screw-threaded connection, as shown.

In order to prevent the body of the wheel from turning upon its axis with relation to the tire B, we have provided interfitting recesses and projections between said parts. As herein shown, the body portion A is provided with integral radially-extending lugs which rise slightly above the level of the rear face of the wheel $A^2$, herein shown as two in number and oppositely arranged upon the wheel. The flange $b$ of the tire is provided with recesses with which said lugs $A^2$ are adapted to be engaged. Said lugs will desirably be of a thickness equal to the thickness of the flange $b$, so that the outer surface thereof will lie flush with the outer surface of the flange when the tire is upon the wheel and the retaining-ring screwed thereon. If desired, this arrangement of the locking means might be reversed and the lugs mounted upon the tires to engage recesses upon the body of the wheel; but the arrangement herein shown is thought to be a preferred one.

It will be seen that we have provided an exceedingly simple and effective means of locking the tire upon the body portion of the wheel and one which does not add to the weight of the wheel nor weaken the tire. There are no securing-bolts to become loosened, and the retaining-ring $b'$ is so mounted in place that it will never become loosened by the jars to which the wheel is subjected.

It will be understood that the details of the construction herein shown and described may be changed without departing from the spirit of the invention, and we do not wish to be limited to the particular construction except as made the subject of specific claims.

We claim as our invention—

1. In a car or locomotive wheel the combination with a body portion and a detachable tire which latter is provided with a rail-flange, of an inwardly-facing shoulder on said tire radially opposite said flange adapted to engage one side of said body portion and a detachable retaining-ring having screw-threaded connection with said tire at the part thereof laterally opposite said shoulder and adapted to engage said body portion on the side thereof opposite to the side engaged by said shoulder.

2. In a car or locomotive wheel, the combination with the body portion and a detachable tire of greater width than that portion of the body engaged thereby, a radially-extending annular flange on said tire engaging one side of the body of the wheel and provided with recesses, laterally-extending lugs on the side face of the body of the wheel engaging said recesses of the flange, and means for locking the body of the wheel from lateral movement with relation to said tire.

3. In a car or locomotive wheel, the combination with a body portion and a detachable tire, of a shoulder on said tire adapted to engage one side of said body portion, a ring having screw-threaded connection with the tire and adapted to engage the other side of the body portion, and radially-extending interfitting recesses and projections between said tire and body portion.

In testimony that we claim the foregoing as our invention we affix our signatures, in presence of two witnesses, this 18th day of May, A. D. 1897.

FRANK C. BUTZE.
CARLTON C. HEWITT.

Witnesses:
WILLIAM L. HALL,
CHARLES G. MASON.